United States Patent [19]

Schweikl

[11] 4,281,795

[45] Aug. 4, 1981

[54] JET PIPE ARRANGEMENT FOR AIRCRAFT PROPULSION AND CONTROL

[75] Inventor: Ludwig Schweikl, Moosburg, Fed. Rep. of Germany

[73] Assignee: MTU Motoren-und-Turbinen-Union Munchen GmbH, Munich, Fed. Rep. of Germany

[21] Appl. No.: 17,275

[22] Filed: Mar. 5, 1979

[30] Foreign Application Priority Data

Mar. 3, 1978 [DE] Fed. Rep. of Germany ....... 2809169

[51] Int. Cl.$^3$ ............................................. B64C 15/02
[52] U.S. Cl. .................. 239/265.35; 60/232; 244/12.4
[58] Field of Search ................ 239/265.35; 60/232; 244/12.4, 52, 56

[56] References Cited

U.S. PATENT DOCUMENTS

| | | | |
|---|---|---|---|
| 3,155,342 | 11/1964 | Bölkow et al. | 244/52 X |
| 3,249,306 | 5/1966 | Altseimer | 244/52 |
| 3,358,932 | 12/1967 | Wilhite | 239/265.35 X |
| 3,361,362 | 1/1968 | Edwards | 239/265.35 |
| 3,727,843 | 4/1973 | Parilla | 239/587 |
| 3,776,467 | 12/1973 | Riemerschmid | 239/265.35 |
| 4,104,877 | 8/1978 | Bone et al. | 60/232 X |

FOREIGN PATENT DOCUMENTS 600397 4/1948 United Kingdom ...................... 244/52

Primary Examiner—Robert W. Saifer
Attorney, Agent, or Firm—Craig and Antonelli

[57] ABSTRACT

A jet pipe arrangement is provided for the propulsion and control of an aircraft, which arrangement includes a first stationary pipe section which has a second pipe section fitted with a thrust nozzle attached thereto. To facilitate a simply constructed and operated control arrangement for rotatably moving the second pipe section with respect to the first pipe section, two pairs of angle levers are disposed about the circumference of the first pipe section. The first pair of angle levers are located opposite one another on the first pipe section and have pivot fulcrums located in the plane parallel to the vertical pivot axis of the second pipe section. The second pair of angle levers are likewise located at respective opposite sides on the circumference of the first pipe section and include pivot fulcrums located in a plane parallel to the horizontal pivot axis of the second pipe section. With this arrangement of the angle levers, it is possible to selectively pivot the second pipe section about either or both of the horizontal and vertical pivot axes. To accommodate shifting of the effective rotational or pivot axes of the second pipe section, compensating linkages are also provided between the angle levers and the respective pipe sections.

38 Claims, 12 Drawing Figures

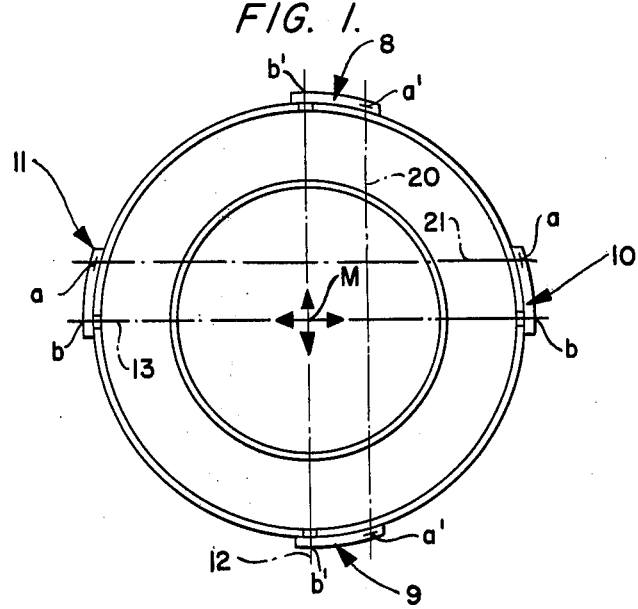
FIG. 1.
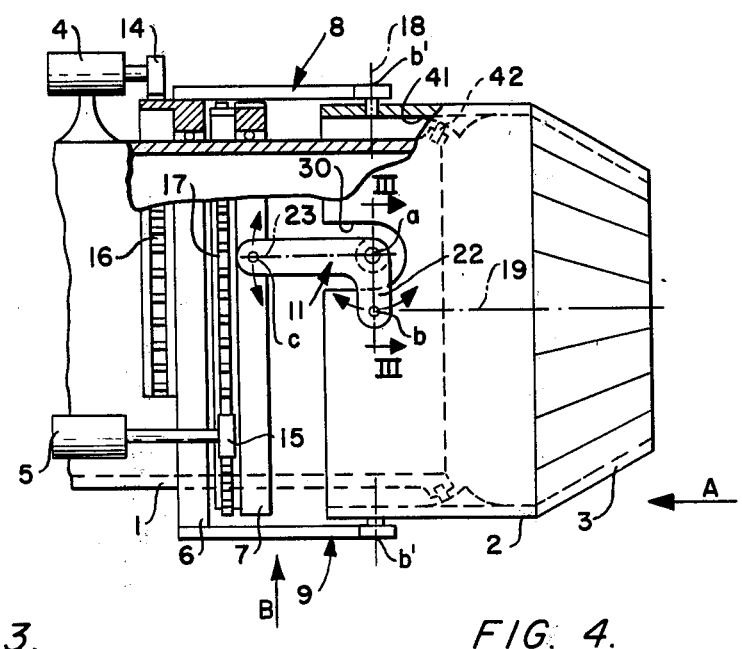
FIG. 2.
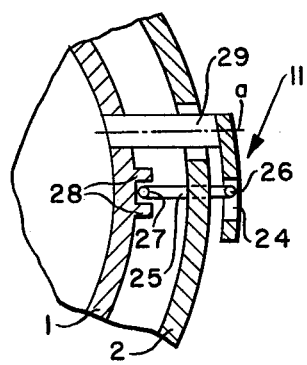
FIG. 3.
FIG. 4.

JET PIPE ARRANGEMENT FOR AIRCRAFT PROPULSION AND CONTROL

BACKGROUND AND SUMMARY OF THE INVENTION

The invention relates to a jet pipe arrangement for the propulsion and control of aircraft, featuring a stationary first pipe section on which a second pipe section fitted with a thrust nozzle is located so that it is multi-directionally rotatable.

Jet pipes of the above-noted type are known from DE-OS (German Published Unexamined Applications) 2,248,480 and 1,931,747, for example. In these two cases, the stationary first and the rotatable second pipe section fit into each other by means of pipe convexities to achieve the multi-directional rotation of the engine gas exhaust. Actuating devices for the pipe sections which are equipped with the thrust nozzle are not shown in said cases.

In the two above-noted cases, it is regarded as disadvantageous that quite considerable aerodynamic losses of the engine gas exhaust have to be assumed as a result of the convexities of both pipe sections, which losses include so-called well-known "Carnot's shock losses" of fluid dynamics. In these prior cases the desire for suitable rotatability of the second pipe section equipped with the thrust results requires actuating forces to be introduced each in two points as a result of the cardanic suspension. This calls for comprehensive reinforcements on the spherical wall or jet pipe sections which results in disadvantages with regard to weight. Besides, technical problems are to be expected with regard to the creation of a suitable thrust nozzle actuating system as a result of the two pipe sections fitting into each other by means of the convexities.

A further device for the deflection of the propulsive jet of gas turbine jet engines is known from U.S. Pat. No. 3,776,467, in which the stationary engine jet pipe is followed by two pipe sections, rotatably attached to each other, the plane of the pivot bearing or the sectional plane between these two rotatable pipe sections being inclined relative to the jet pipe longitudinal axis such that the propulsive jet is, for example, either deflectable in the vertical engine or jet pipe longitudinal center plane or is multi-directionally deflectable as a result of simultaneous rotation of the two pipe sections relative to each other by equal angles of rotation or by rotating the two pipe sections by different angles of rotation.

Although the last-mentioned known solution may be suitable for relatively slow rotations of the thrust nozzle or the pipe section equipped with the thrust nozzle, problems arise when relatively fast changes of the direction of the thrust vector are required which would result in relatively high rotational speeds and accelerations of the rotatable pipe section and consequent high drive power requirements. Due to the differential gear and rim gears provided in this known arrangement for the drive of the two pipe sections on the pipe sections, a relatively high manufacturing investment and weight is to be expected.

In another contemplated proposal, the second pipe section is equipped with the thrust nozzle and is connected to the first stationary pipe section via a flexible hose or equivalent by means of a hydraulic, pneumatic or mechanical actuating device for rotating the second pipe section. This actuating device is located on the circumference of the engine at several points and has to traverse differently regulated control paths to achieve thrust vector control. In this proposal the forces caused by the sectioned pressure vessel have to be taken up by the actuating elements which will result in relatively high actuating forces and thus relatively large sized components of this actuating device.

An object of the present invention is to eliminate the disadvantages of known solutions and to create a jet pipe of the aforementioned general type, which enables rapid changes of the thrust vector in a comparatively simple way.

As a solution to this problem it is proposed by the invention that actuating elements are located on the first pipe section which are pivotally connected to the second pipe section in such a way, that the second pipe section is rotatable about either a vertical or a horizontal axis of rotation or simultaneously about both of these two axes.

Particularly preferred embodiments of the invention include various of the following advantageous constructional features:

(a) All angle levers which connect the first and second pipe sections are rotatably located with their respective fulcrums on the first pipe section, all fulcrums being preferably in one plane which intersects the engine or jet pipe longitudinal axis.

(b) Two angle lever fulcrums of a first pair of angle levers are located substantially diametrically opposite to each other on the circumference of the first pipe section in a plane parallel to the vertical axis of rotation of the second pipe section.

(c) Two angle lever fulcrums of a second pair of angle levers located substantially diametrically opposite to each other on the circumference of the first pipe section are in plane parallel to the horizontal axis of rotation of the second pipe section.

(d) The pivotal points at the end of a free leg of each angle lever of the first pair of angle levers are on the vertical axis of rotation of the second pipe section, while the pivotal points at the end of one free leg of each angle lever of the second pair of angle levers are on the horizontal axis of rotation of the second pipe section.

(e) Two annular members, as actuating elements, which can be motor-driven either simultaneously or independently of each other, are rotatably located on the circumference of the first pipe section, the first pair of angle levers being attached to the first annular member via their remaining free ends and the second pair of angle levers being attached to the second annular member via their remaining free ends.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a partial schematic view taken in the direction of arrow A in FIG. 2;

FIG. 2 is a side part sectional schematic side view showing a jet pipe arrangement constructed in accordance with a first preferred embodiment of the present invention;

FIG. 3 is a partial sectional view taken along line III—III of FIG. 2;

FIG. 4 is a partial view taken in the direction of arrow B in FIG. 2;

DETAILED DESCRIPTION OF THE DRAWINGS

Figure 5:
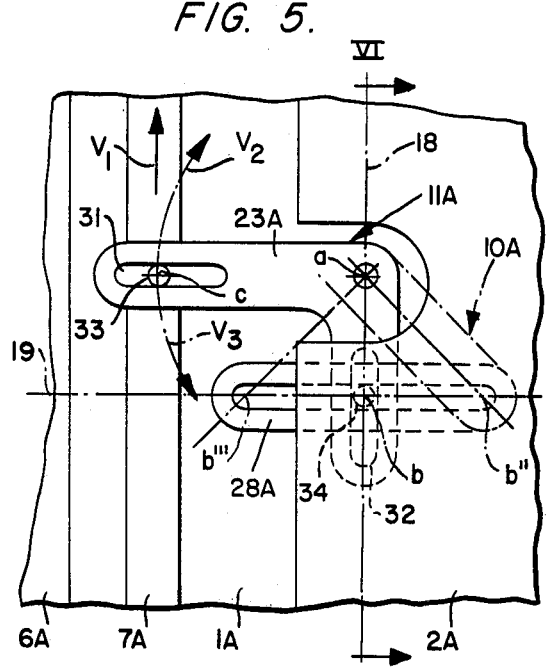
FIG. 5 is an enlarged lateral partial view of a jet pipe arrangement wherein the angle levers are partially shrouded by the second rotatable pipe section in accordance with a further preferred embodiment of the present invention.

FIGS. 1 and 2 schematically depict a jet pipe featuring a stationary first pipe section 1 on which a second multi-directionally rotatable pipe section 2 is located. To achieve this rotatability, two annular members 6, 7, which are preferably driven by electric motors are located circumferentially rotatable on the first jet pipe and are connected to the second pipe section 2 via angle levers 8, 9, 10, 11 in such a way that pipe section 2 is rotatable either about a vertical axis of rotation 12 or about a horizontal axis of rotation 13 or simultaneously about both of these two axes 12, 13. The pinions 14, 15 located on the elongated shafts of the electric motors 4, 5 mesh with the rim gears 16, 17 of the two annular members 6, 7.

Furthermore, all angle levers 8, 9, 10, 11 are pivotally located on the first pipe section 1, in their respective fulcrums a, a', all fulcrums a, a' being in a plane 18, which perpendicularly intersects the produced engine or jet pipe longitudinal axis 19. The two fulcrums a' of a first pair of angle levers 8, 9 are located opposite to each other on the circumference of the first jet pipe section 1 in a plane 20 which is parallel to the vertical axis of rotation 12 and the two fulcrums a of a second pair of angle levers 10, 11 are located opposite to each other on the circumference of the first pipe section 1 in a plane 21 which is parallel to the horizontal axis of rotation 13 of the second pipe section.

As best shown in FIGS. 1 and 4, the pivot points b' are located on the end of one free leg 22' of each angle lever of the first pair of angle levers 8, 9 on the vertical axis of rotation 12 of the second pipe section 2, while the pivot points b are located on one free leg 22 of each angle lever of the second pair of angle levers 10, 11 on the horizontal axis of rotation 13. The remaining free end 23' of the first pair of angle levers 8, 9 is connected to the first annular member 6 in the points c', while the second pair of angle levers 10, 11 are connected to the second annular member 7 in the points c.

Depending upon lever arm kinematics, the rod 39 will shift within slot 40 and pin 38 will shift within slot 37, thereby compensating for axis dislocations. In practice, in dependence on the desired deflection angle, of the second pipe section, the horizontal axis of rotation 13 is dislocated in the horizontal plane about the center point M (FIG. 1) and the originally vertical axis of rotation 12 is dislocated, simultaneously or by itself, in the vertical plane about the center point M. Accordingly, actuating lever arm kinematics require that pivot axes be able to shift relative to at least two of the lever arms in order to enable these axis dislocations to be accommodated or compensated for. The compensating devices described hereinafter are advantageously provided or compensate for such dislocations and assure reliable operation, with a minimum of constructional expenditures.

The actuating system kinematics, which are represented in FIGS. 1 and 2 only in a schematic form, are supplemented as shown in FIG. 3 by allocation of so-called "compensating devices". For example, the angle lever 11 is equipped with an oblong guide hole 24 in which a guide member 25 with a spherical surface 27 is displaceably located (pipe section 2 including an opening to accommodate 25). A spherical surface 27 on the opposite end of the guide member 25 engages a guide 28 on the first section 1. The angle lever 11 is pivotally located on a bolt 29, which extends via a recess 30 (FIG. 2) on the side of the second pipe section 2 to the outside. Assuming that the described compensation and guide means are analogously assigned to the angle lever 10, the pipe section 2 can be rotated about the vertical axis of rotation 12. When the lever arms 10, 11 are actuated in conjuction with lower arms 8, 9 motion will occur about both axes 12, 13 and any axis dislocations dictated by lever arm kinematics being accommodated by shifting of end 26 of guide 25 within slot 24.

In the drawing Figures showing other preferred embodiments of the invention, like reference numbers as in FIGS. 1 to 4 with respective different letter suffixes, are used to designate components generally similar to corresponding components described above in connection with FIGS. 1 to 4. Unless otherwise stated, it can be assumed that the description above for these components in the embodiment of FIGS. 1 to 4 also applies generally to the correspondingly numbered components of these other embodiments, and therefore such description will not be repeated except to the extent considered necessary to an understanding of the invention.

Figure 6:
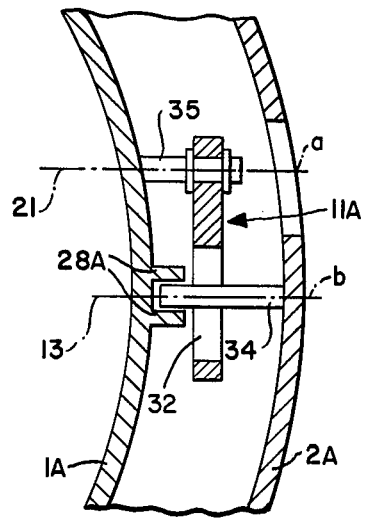
FIG. 6 is a sectional view taken along line VI—VI of FIG. 5.
Figure 7:
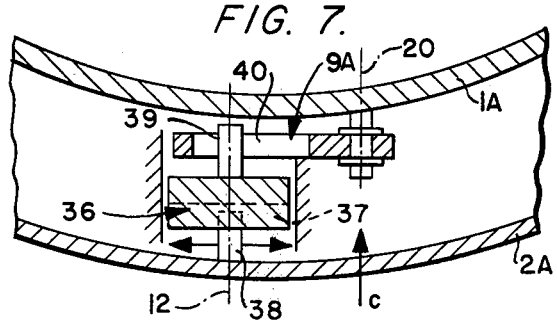
FIG. 7 is a sectional view of a lower angle lever with corresponding compensating slide between the first and second pipe section, constructed in accordance with a further preferred embodiment of the invention.
Figure 8:
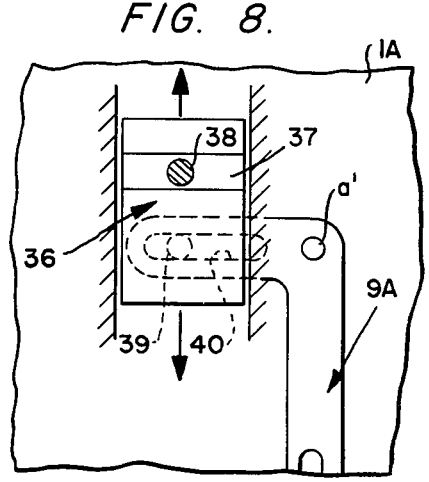
FIG. 8 is a partial view taken in the direction of arrow C in FIG. 7.

In the preferred embodiment shown in FIGS. 5 to 8, the second rotatable pipe section 2A shrouds all angle levers at least partially, as this is illustrated in FIG. 5 for the angle lever 11A and in FIG. 7 for the angle lever 9A.

Referring to FIG. 5, angle lever 11A is equipped with oblong guides slots 31, 32 serving as compensating means, a pin-type guide member 33 connected to the second annular member 7A engaging the guide slot 31 and a pin-type guide member 34 connected to the second pipe section 2A engaging the guide slot 32. All remaining angle levers 8A, 9A and 10A are correspondingly equipped with similar guide slots.

Referring further to FIGS. 5 and 6, the guide member 34 is located parallel to the jet pipe longitudinal axis 19 and displaceably in guide 28A on the outside of the first pipe section 1A, serving simultaneously as pivot for the second pipe section 2A when it is to be rotated about the horizontal axis of rotation 13. As shown in FIG. 6, the angle lever 11A is pivotally located in point a by a pin 35 which is connected to the first pipe section 1.

The components shown in FIGS. 5 and 6 and the compensating and guide means are analogously provided at the angle lever 10 which is rotatable in point a on the opposite side of the first pipe section 1A.

As with the preceding embodiment, shifting of the pin 34 within slot 32 in accordance with lever arm kinematics compensates for axis dislocations.

As mentioned above, the pair of angle levers 10A, 11A is used to rotate the second pipe section 2A about the vertical axis of rotation 12 (FIG. 1). The rotation of the annular member 7A in the direction of arrow V1 (FIG. 5) causes simultaneous rotation of the angle lever 11A about point a in the direction of arrow V2 and simultaneous rotation of the angle lever 10A on the opposite side about point a in the direction of arrow V3, if necessary to the final position indicated by a dash-dot line. The points b of the two angle levers 10A, 11A then become points b″ (for lever 10A) and b‴ (for lever 11A) as a result of simultaneous travel relative to each other in the horizontal plane.

To achieve a satisfactory multi-directional rotation of the pipe section 2A, axially displaceable compensating slides 36 (FIGS. 7 and 8) are preferably connected between the first pair of angle levers 8A, 9A and the second pipe section 2A. To achieve this, the compensating slide 36 is equipped with a guide groove 37 which is engaged by a spigot or rod 38 connected to the second pipe section 2A and with another spigot or rod 39 which engages the oblong guide slot 40 of angle lever 8A or 9A in a plane offset to said guide groove 37. The guide members 38 may serve simultaneously as pivots for the second pipe section 2A which is rotatable around the vertical axis of rotation 12.

It can further be seen from FIG. 2, that the second pipe section 2 is preferably displaceably located on a seal 42, which is located axially symmetrical on the outer end of the first pipe section 1, by means of a spherical inner wall surface 41.

Figure 9:
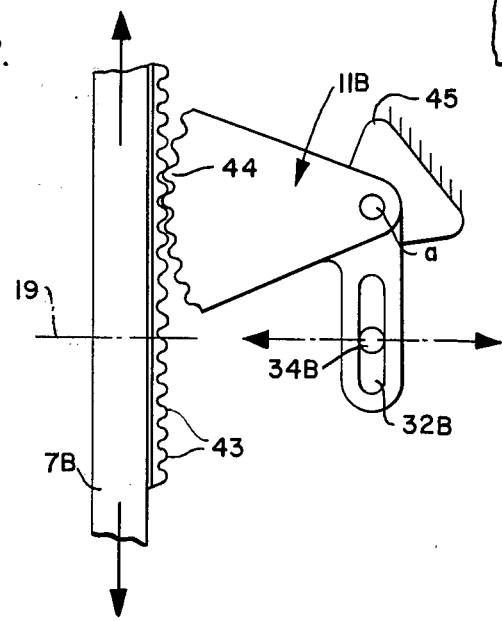
FIG. 9 is a schematic side view of an auxiliary gearing arrangement for the actuation of an angle lever, constructed in accordance with a further preferred embodiment of the invention.

Furthermore, auxiliary gearing may be provided according to contemplated preferred arrangements of the invention which serve to convert the rotational motion of the annular members 6, 7 into a desired actuation lever movement. In this connection, reference is made to FIG. 9, according to which the annular member 7B, for example, is provided with a rim gear 43 which engages a rim gear 44 located on a suitably enlarged outer end of the angle lever 11B.

Figure 10:
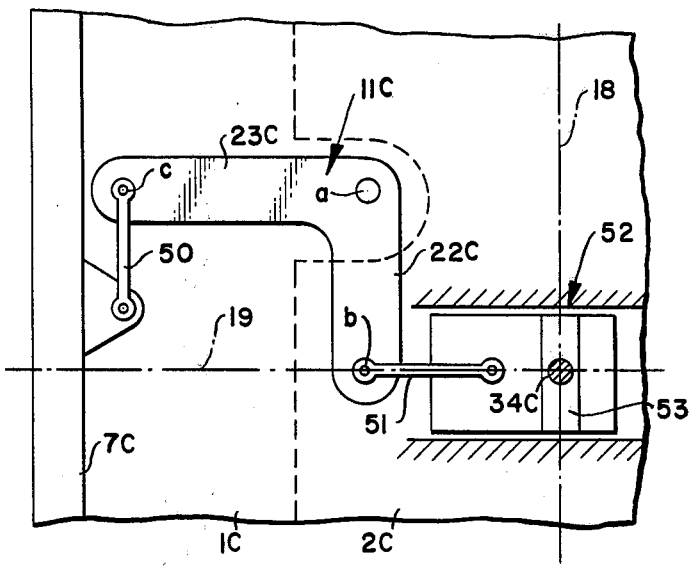
FIG. 10 is a schematic partial side view of a jet pipe arrangement constructed in accordance with a further preferred embodiment of the invention.

FIG. 10 illustrates an embodiment providing for connecting the angle lever 11C to an annular member 7C using a first link 50 and to a compensating slide 52 located axially displaceable on the side of jet pipe section 1C, using a second link 51. The pin-type guide member 34C connected to the second pipe section 2C engages a groove 53 on the compensating slide 52. Although not specifically shown in the Figures, it is provided all remaining angle levers 8, 9 and 10 are analogously to be connected to their respective annular member or compensating slide. These slides achieving their compensating function by movement of rod 34C within slot 53 similar to that of the preceding embodiments. As is further visible from FIG. 10, the fulcrum a of the angle lever 11C is outside the plane 18 which passes through the center point M (FIG. 1), obviously, this applies to the remaining fulcrums a of the angle lever 10C and a′ of the angle levers 8C, 9C, as well.

Figure 11:
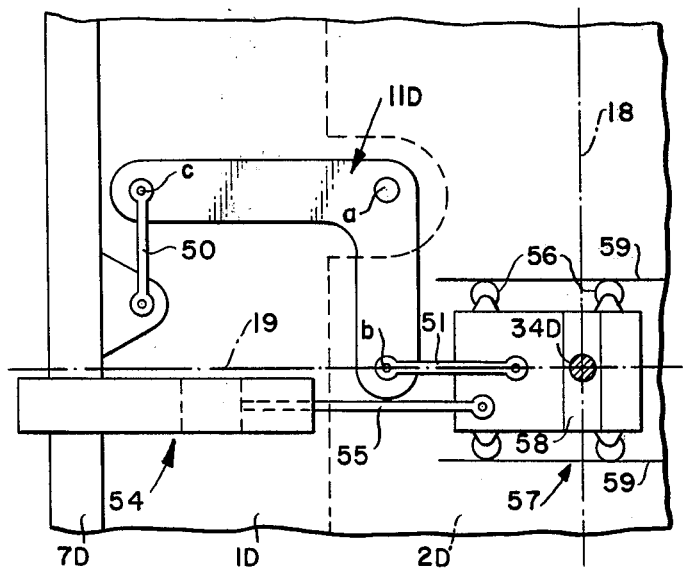
FIG. 11 is a schematic partial side view of a jet pipe arrangement constructed in accordance with a further preferred embodiment of the invention.

In the FIG. 11 embodiment it is provided that the second pipe section 2D is not actuated or rotated by the two power-driven annular members 6, 7 as described above from other embodiments, but that such rotation is by way of hydraulic cylinders 54 attached to the first pipe section 1D. In lieu of the hydraulic cylinders, pneumatic cylinders or power-driven ballscrews could also be used according to yet further contemplated embodiments.

Referring to FIG. 11, the piston rod 55 extending from the actuating cylinder 54 is connected to a carriage 57 displaceably located on the first pipe section 1D on rollers 56, which is equipped with a groove 58 engaging the pin-type guide member 34D connected to the second pipe section 2D. The angle lever 11D, in turn, is connected to the annular member 7D via the link 50 and to the carriage 57 via the link 51. The tracks 59 for the rollers of the carriage 57 may be either straight or curved in accordance with alternative preferred embodiments of the invention.

Referring to the arrangement of FIG. 11, another actuating cylinder, which is not further shown in the Figures, may be located on jet pipe section 1D 90 degrees offset to the actuating cylinder 54, its piston rod would have to be connected to a 37 carriage" or "compensating slide" which, in turn, would have to be connected to an allocated angle lever 9D by means of links. In the described preferred embodiments, it should be clear that the remaining angle levers 8′ and 10, by means of links, are to be connected to "carriages" and "compensating slides" on the one hand and to the annular members 6D or 7D, respective on the other. With the above-described arrangements, the second jet pipe section may be rotated about one or simultaneously about both of the two axes of rotation 12, 13 (FIG. 3) by means of the two, approximately 90 degress offset, actuating cylinders without the necessity for a motor-drive via the two annular members 6D, 7D, which only have a guiding function and serve for the control of the angle lever movement.

According to the exemplary embodiment of the invention as per FIG. 11 the said actuating system kinematics—the actuating force being introduced in only two points—enable multi-directional rotation of the jet pipe section 2D without any further auxiliary equipment, the forces resulting from the jet pipe internal pressure being taken up by the said kinematics and only frictional and acceleration forces to be carried by the actuating elements.

Figure 12:
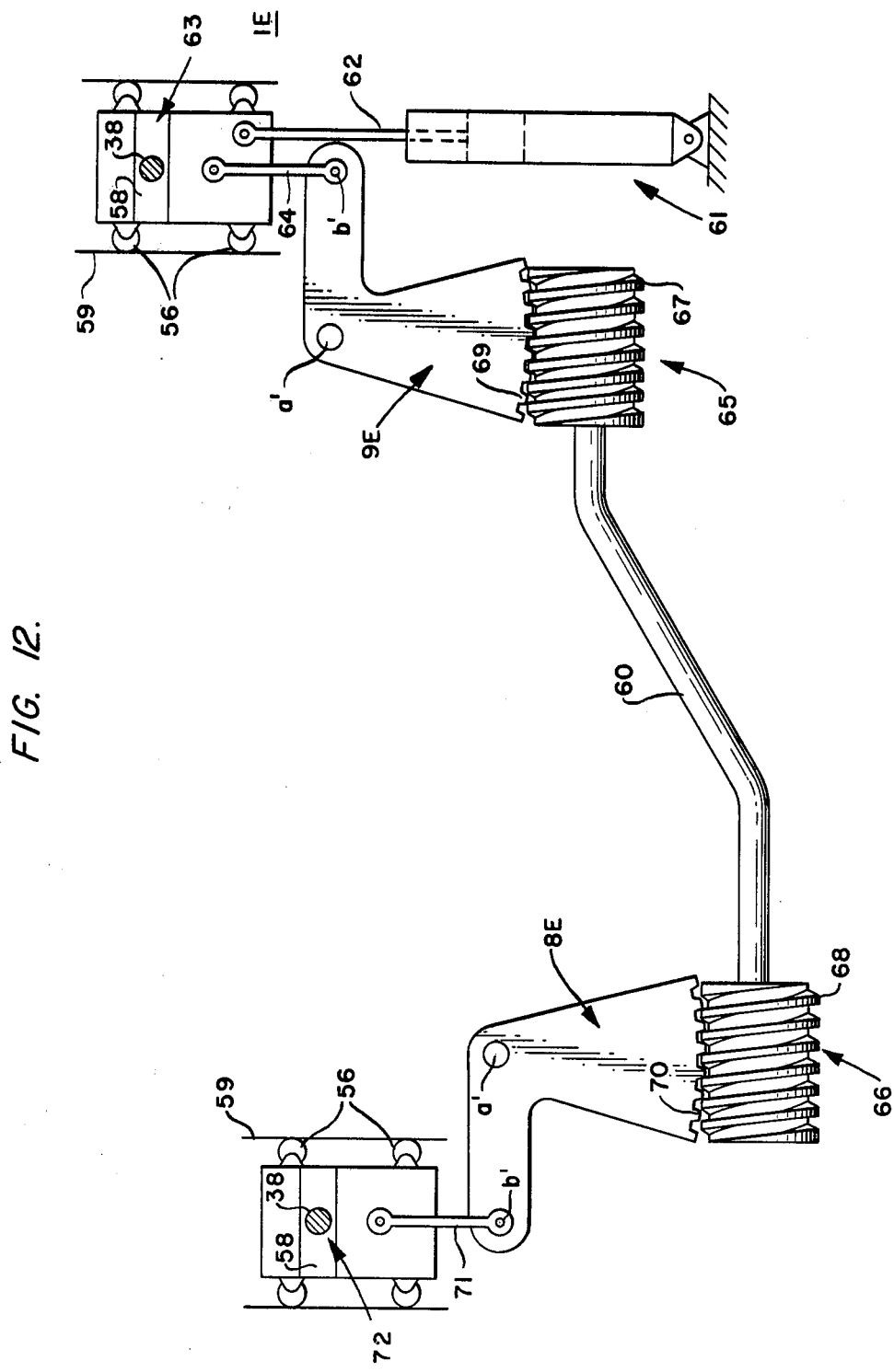
FIG. 12 is a schematic projected view which depicts a further variant of actuating means constructed in accordance with the present invention.

In the above-mentioned exemplary embodiment of the invention as per FIG. 11, according to which the annular members 6D, 7D only serve for guidance and movement control, the replacement of these annular members 6D, 7D with other power transmitting elements such as flexible bands, chain or rope drives or flexible shafts, designated 60 in FIG. 12, is also contemplated according to yet further preferred embodiments of the invention.

When bands, chain or rope drives are used, the angle levers 8, 9 are to be connected to the corresponding bands, chain or rope drives in pivot point c′, the angle lever 10, 11 in points c.

FIG. 12 illustrates an exemplary embodiment of the invention, schematically represented and projected in the drawing plane, in which a further actuating cylinder 61 located on the circumference of the jet pipe section 1E is provided. Piston rod 62 of cylinder 61 is connected to a carraige 63 displaceably located on the first pipe section 1E, which, in point b', is connected to the angular lever 9E via a link 64. The angle levers 9E and 8E are connected to the flexible shaft 60 by means of so-called "worm drives" 65, 66. These worm drives 65, 66 consist of cylindrical worms 67, 68, of which the threads mesh with the rim gears 69, 70 of the angle levers 9E or 8E, respectively. Thus, it is possible to simultaneously rotate the two angular levers 8E, 9E relative to each other in their respective fulcrums a' and to rotate the second pipe section 2E about the axis of rotation 13.

According to FIG. 12 the angle lever 8E, in point b', is also connected to a link 71, which, in turn, is connected to a carriage 72 which is axially displaceable on the pipe section. This carriage 72 is located on the first jet pipe 1E opposite to the carriage 63, and in principle its design corresponds to that of the carriage 57 in FIG. 11.

The actuating kinematics for the rotation of the second pipe section 2E round the axis of rotation 12 can be designed on the same principle, in which case, among others, the angle levers 10E, 11E would have to be connected to a further flexible shaft by means of worm drive means.

The exemplary embodiments of the invention shown in FIGS. 3, 7, 8, 10, 11 and 12 give satisfactory kinematic conditions. However, further acceptable kinematic malfunction is preferably also taken into account with regard to the oblong compensating holes in the knee levers 11, for example as per FIGS. 5 and 6.

The jet pipe arrangements of the invention are especially suitable for executing relatively rapid aircraft control maneuvers, for example around its yaw or pitch axis.

It is advantageous according to preferred arrangements of the invention, that the jet pipe, together with the thrust nozzle are assigned to one or more jet engines located in the tail section of an aircraft.

The absence of aerodynamic obstructions to the gas flow in all positions of the jet pipe of this invention also enables an exhaust gas reheating device to be installed in its interior and accommodates the satisfactory flow of the hot reheat gases.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. Jet pipe arrangement for propulsion and control of an aircraft or the like, comprising:
   a relatively stationary first pipe section,
   a second pipe section fitted with a thrust nozzle and disposed downstream of said first pipe section for multi-directional rotation to control the direction of expulsion of thrust gases through said thrust nozzle,
   and actuation element means attached to the first pipe section and including means for imparting relative movement to said second pipe section with respect to said first pipe section, said actuation element means including angle lever means interconnecting said first and second pipe sections in such a way that said second pipe section is pivotable selectively about either one or both of respective horizontal and vertical pivot axes through said second pipe section, wherein said angle lever means includes a plurality of angle levers which are rotatably located on the first pipe section at their respective fulcrums, all fulcrums being preferably in a plane which perpendicularly intersects the extended engine or jet pipe longitudinal axis.

2. Jet pipe arrangement according to claim 1, wherein two fulcrums of a first pair of the angle levers are located opposite to each other on the circumference of the first pipe section and are in a plane which is parallel to the vertical pivot axis of the second pipe section.

3. Jet pipe arrangement according to claim 2, wherein two fulcrums of a second pair of the angle levers are located opposite to each other on the circumference of the first pipe section and are in a plane which is parallel to the horizontal pivot axis of the second pipe section.

4. Jet pipe arrangement according to claim wherein pivotal points are provided are the end of one leg of each angle lever of the first pair of angle levers and are located on the vertical pivot axis of the second pipe section, and wherein pivotal points are provided at the end of one leg of each angle lever of the second pair of angle levers and are located in the horizontal pivot axis of the second pipe section.

5. Jet pipe arrangement according to claim 4, wherein a first and second annular members are provided which can be motor-driven either together or independently of each other, said annular members being rotatably located on the circumference of the first pipe section, the first pair of angle levers being connected to the first annular member via second ends thereof and the second pair of angle levers being attached to the second annular member via second ends thereof.

6. Jet pipe arrangement according to claim 5, wherein compensation devices are provided to accommodate the actuating lever kinematics of the first and second pair of angle levers.

7. Jet pipe arrangement according to claim 6, wherein the compensating devices include oblong guide slots provided in the angle levers which are engaged by guide members which are connected to at least one of the second pipe section, the first annular member, and the second annular member.

8. Jet pipe arrangement according to claim 7, wherein the guide members also form the pivots of the second pipe section.

9. Jet pipe arrangement according to claim 8, wherein there are guide members for at least one of the first and second pair of angle levers which are displaceably guided in a respective first or second plane which goes through the jet pipe longitudinal axis and at the outward side of the first pipe section.

10. Jet pipe arrangement according to claim 9, wherein the guide members located on the first pipe section, which are engaged by the guide members located on the second pipe section, are in the shape of a curve with regard to the radius of rotation of the second tube section.

11. Jet pipe arrangement according to claim 10, characterized in that the guide members are equipped with spherical guide surfaces.

12. Jet pipe arrangement according to claim 11, wherein at least two of the angle levers are each connected to the second pipe section via compensating slides which are axially displaceably located on the first pipe section.

13. Jet pipe arrangement according to claim 12, wherein each compensating slide is provided with a guide groove which is engaged by a pin-type guide member connected to the second pipe section and with another pin-type guide member which engages the corresponding oblong guide slot of an angle lever in a plane offset in relation to said guide groove.

14. Jet pipe arrangement according to claim 13, wherein the angle levers or the compensating devices are at least partially shrouded by the second pipe section.

15. Jet pipe arrangement according to claim 14, wherein the second pipe section is dispaceable along a seal located axially symmetrical at the outer end of the first pipe section by means of a spherical inner wall surface.

16. Jet pipe arrangement according to claim 15, wherein auxiliary gearing is provided which can be used to convert the rotary movement of the annular members into the desired actuating lever movement.

17. Jet pipe arrangement according to claim 16, wherein the annular members are equipped with rim gears which engage rim gears located on enlarged outer ends of the angle levers.

18. Jet pipe arrangement according to claim 4, wherein flexible power-transmitting elements are provided to transmit power between actuating motor means and the pipe section and are rotatably attached to the circumference of the first pipe section by means of rollers.

19. Jet pipe arrangement according to claim 18, wherein flexible shafting is connected to the angle levers via worm drives.

20. jet pipe arrangement according to claim 18, wherein said flexible power-transmitting elements comprise flexible shafts.

21. Jet pipe arrangement according to claim 4, wherein fluid operated actuating cylinders are attached to the first pipe section serving as actuating elements for the rotation of the second pipe section, their piston rods being connected to one of the second pipe section and a compensating device.

22. Jet pipe arrangement according to claim 21, wherein at least two actuating cylinders are located approximately 90 degrees offset to each other on the circumference of the first pipe section, the piston rod of the one actuating cylinder being attached to that compensating device which is connected to an angle lever of the first pair of angle levers and the piston rod of the other actuating cylinder being connected to that compensating device which is connected to an angle lever of the second pair of angle levers.

23. Jet pipe arrangement according to claim 4, wherein motor-driven ballscrews are provided to serve as actuating elements for the rotation of the second pipe section, movable piston rod means of said ballscrews being connected to the second pipe section or to a compenating device.

24. Jet pipe arrangement according to claim 5, wherein auxiliary gearing is provided which can be used to convert the rotary movement of the annular members into the desired actuating lever movement.

25. Jet pipe arrangement according to claim 5, wherein the annular members are equipped with rim gears which engage rim gears located on enlarged outer ends of the angle levers.

26. Jet pipe arrangement according to claim 25, wherein the angle levers are connected to at least one of their respective annular members the second pipe section and a respective compensating slide via links.

27. Jet pipe arrangement according to claim 6, wherein the angle levers are connected to at least one of their respective annular members, the second pipe section and a respective compensating slide via links.

28. Jet pipe arrangement according to claim 6, wherein said compensation devices includes carriages which are displaceably guided on the first pipe section by means of wheel-like elements, corresponding tracks being provided therefor.

29. Jet pipe arrangement according to claim 6, wherein at least two of the angle levers are each connected to the second pipe section via compensating slides which are axially displaceably located on the first pipe section.

30. Jet pipe arrangement according to claim 29, wherein each compensating slide is provided with a guide groove which is engaged by a pin-type guide member connected to the second pipe section and with another pin-type guide member which engages a corresponding oblong guide slot of an angle lever in a plane offset in relation to said guide groove.

31. Jet pipe arrangement according to claim 10, characterized in that the guide members are equipped with crowned guide surfaces.

32. Jet pipe arrangement according to claim 1, wherein compensation devices are provided to accommodate the actuating lever kinematics of the angle lever means.

33. Jet pipe arrangement according to claim 32, wherein said compensation devices include carriages which are displaceably guided on the first pipe section by means of wheel-like members, corresponding tracks being provided therefor.

34. Jet pipe arrangement according to claim 1, wherein
a first pair of said angle levers are located opposite one another on the circumference of the first pipe section,
said first pair of angle levers having respective fulcrums in a plane parallel to the vertical pivot axis of the second pipe section, and
a second pair of said angle levers are located opposite one another on the circumference of the first pipe section, said second pair of angle levers having respective fulcrums in a plane parallel to the horizontal pivot axis of the second pipe section.

35. Jet pipe arrangement according to claim 34, wherein pivotal points are provided at the end of one leg of each angle lever of the first pair of angle levers and are located on the vertical pivot axis of the second pipe section, and wherein pivotal points are provided at the end of one leg of each angle lever of the second pair of angle levers and are located in the horizontal pivot axis of the second pipe section.

36. Jet pipe arrangement according to claim 34, wherein first and second annular members are provided which can be motor-driven either together or independently of each other, said annular members being rotatably located on the circumference of the first pipe section, the first pair of angle levers being connected to the first annular member via second ends thereof and the second pair of angle levers being attached to the second annular member via second ends thereof.

37. Jet pipe arrangement according to claim 6 or 36, wherein the angle levers or the corresponding devices are at least partially shrouded by the second pipe section.

38. Jet pipe arrangement according to claim 1, wherein the second pipe section is displaceable along a seal located axially symmetrical at the outer end of the first pipe section by means of a spherical inner wall surface.

* * * * *